United States Patent [19]

Hoover

[11] 3,818,111

[45] June 18, 1974

[54] FINING AND INCREASING THE CHILL HAZE STABILITY OF FERMENTED ALCOHOLIC BEVERAGES

[75] Inventor: Lonnie Daniel Hoover, Hockley, Tex.

[73] Assignee: NL Industries, Inc., New York, N.Y.

[22] Filed: Nov. 30, 1972

[21] Appl. No.: 310,482

[52] U.S. Cl.............................. 426/330, 426/422
[51] Int. Cl............................................. C12h 1/02
[58] Field of Search ................. 99/48; 426/330, 422

[56] References Cited
UNITED STATES PATENTS

| | | | |
|---|---|---|---|
| 2,316,241 | 4/1943 | Heimann................................. | 99/48 |
| 3,617,301 | 11/1971 | Barby et al............................. | 99/48 |

FOREIGN PATENTS OR APPLICATIONS

| | | |
|---|---|---|
| 454,856 | 3/1949 | Canada |

OTHER PUBLICATIONS

Suhner A. R., Agent For Stabilizing and Clarifying Beverages and Their Starting Materials, Especially Beer. Chemical Abstracts, Vol. 75 10/1971 (p. 2/6) QD1A5).

*Primary Examiner*—David M. Naff
*Attorney, Agent, or Firm*—Roy F. House; Delmar H. Larson; Fred Floersheimer

[57] ABSTRACT

A novel process of fining and removing chill haze precursor substances from vegetable beverages, particularly beer, in order to improve the clarity and chill haze stability of such beverages which is characterized by the separate addition to the beverage of a nitrogeneous carbonyl containing organic material which is water soluble or colloidially dispersible in water selected from the group consisting of gelatin, N-vinylpyrrolidone and polymers of N-vinylpyrrolidone and a polysilicic acid coagulant from a source consisting of polysilicic acid hydrosols, stabilized polysilicic acid hydrosols, and polysilicic acid hydrogels in which the polysilicic acid has not polymerized to such an extent that syneresis has occurred, followed by aging of the beverage and removal of coagulated substances from the beverage.

17 Claims, No Drawings

FINING AND INCREASING THE CHILL HAZE STABILITY OF FERMENTED ALCOHOLIC BEVERAGES

BACKGROUND OF THE INVENTION

This invention pertains to the art of fining vegetable beverages and to the art of increasing the chill haze stability in such beverages, particularly beer.

PRIOR ART

Two articles which discuss the background of the invention and which disclose many materials which have been used in fining (clarifying) and preventing haze formation in beer and wine are the following: MBAA Technical Quarterly, Vol. 4, No. 4, Oct.–Dec., 1967, pp. 245–253, "Adsorption of Natural Phenols from Beer and Wine," V. L. Singleton; Kirk-Othmer Encyclopedia of Chemical Technology, 2nd Edition. Vol. 3, 1964, pp. 297–338, "Beer and Brewing."

Generally vegetable beverages such as those obtained from cereals and fruits, particularly the fermented beverages beer and wine, contain therein at some stage during their preparation suspended matter which must be removed before the beverage is bottled. The beverage may be stored in order to allow the suspended matter to settle out although this is expensive due to the low production rates obtained. It is well known to add materials, sometimes called fining agents, to the beverage which will precipitate or coagulate the suspended matter thus making its removal easier such as by filtration.

Beverages obtained from various vegetables also contain various phenolic substances (tannins, anthocyanogens, etc.), proteins and protein-tannin complexes. The larger molecules of these may be removed during the clarification or fining and subsequent filtration of the beverage, however the smaller molecules remain in the beverage. Certain of these tannins and proteins are necessary in the beverage to impart to the beverage its unique properties such as flavor, aroma, and, in the case of beer, foaming tendencies. Some of the tannins and proteins remaining in the beer after bottling may be converted into larger molecules by oxidation and other processes during storage, or the tannins and proteins may combine to form large complex molecules. These then form a haze in the beverage. The beverage usually also contains tannins, proteins, and protein-tannin complexes which are soluble at room temperature but which are insoluble at the lower temperatures at which the beverage is served. These then form the so-called chill haze which forms on chilling the beverage. All of these substances which affect the clarity of the beverage are undesirable.

It is known in the art to treat such beverages with various adsorbents or coagulants which adsorb or coagulate many of the objectionable tannins, proteins, or protein-tannin complexes from the beverage and allow their removal such as by filtration before the beverage is bottled. It is also known to treat such beverages, particularly beer, with certain enzymes such as papain which reduce the molecular weight of protein molecules. These enzymes reduce the concentration of the large protein and protein-tannin complex molecules thus preventing or retarding the formation of the chill haze.

Various polymeric materials have been suggested and used as fining agents, adsorbents, and coagulants in the treatment of beverages. Such natural proteins as gelatin, casein, albumin, and isinglass have been used primarily as fining agents. Various synthetic polymers including polyvinylpyrrolidone (U.S. Pat. Nos. 2,668,550; 2,919,193; 2,939,791; 2,943,941; 3,061,439; and 3,222,180), copolymers of N-vinylpyrrolidone and other vinyl compounds (U.S. Pats. Nos. 2,811,449; 2,946,772; and 2,947,633), polyacrylamide (U.S. Pat. No. 2,860,987), N-vinyl-5-alkyl-2-oxazolidinone polymers and copolymers (U.S. Pats. Nos. 2,872,321; 2,872,322; 2,873,192; and 2,946,722), polyvinylimidazole (U.S. Pat. No. 2,875,062), and polymers of vinylpyridines and their lower alkyl substitution products (U.S. Pat. No. 2,912,333) have all been suggested as adsorbents or coagulants for removing chill haze producing substances.

It has been disclosed in copending U.S. Pat. application Ser. No. 310,804 that a certain form of polysilicic acid is a good coagulant for chill haze precursor substances in fermented beverages. This polysilicic acid also functions as a fining agent to some extent. The information disclosed in the aforesaid application is not essential to the understanding of this invention.

It is known from British Pat. No. 84 AD 1913 that the density of isinglass finings can be increased by combining the isinglass with moist gelatinous silica or silicates and that the resulting product is suitable for fining beers and the like. It is known from U.S. Pat. No. 3,554,759 that a product prepared by precipitating silica from an aqueous alkali metal silicate solution with an acid in the presence of water soluble polyvinyl pyrrolidone, polyvinyl-3-methyl pyrrolidone or vinyl pyrrolidone-vinyl acetate copolymers is suitable for increasing the chill haze stability of beer. Many adsorbents based on silica have been proposed for use in enhancing the colloidial stability of fermented beverages. Thus, U.S. Pat. No. 2,316,241 discloses the use of an alkalized silica gel. U.S. Pat. No. 3,163,538 discloses a silica xerogel having certain specific characteristics. U.S. Pat. No. 3,617,301 discloses the treatment of beer with a silica hydrogel having certain specific characteristics. U.S. Pat. No. 3,512,987 discloses the use of porous glass containing 96 percent silica. U.S. Pat. No. 3,413,120 discloses the use of a calcium silicate containing 0.1 to 5 percent calcium.

SUMMARY OF THE INVENTION

I have now found that the separate addition to a vegetable beverage of (1) a nitrogeneous carbonyl containing organic material which is water soluble or colloidially dispersible in water selected from the group consisting of gelatine, N-vinylpyrrolidone, and polymers of N-vinyl pyrrolidone and (2) a polysilicic acid coagulant from a source consisting of polysilicic acid hydrosols, stabilized polysilicic acid hydrosols, and polysilicic acid hydrogels in which the polysilicic acid has not polymerized to such an extent that syneresis has occurred, synergistically fines and increases the chill haze stability of the beverage.

Accordingly, it is an object of this invention to provide a process for fining and increasing the chill haze stability of a vegetable beverage, which comprises, (a) adding to the beverage separately and in any order (1) a nitrogeneous carbonyl containing organic material which is water soluble or colloidially dispersible in water selected from the group consisting of gelatin, N-vinyl pyrrolidone, and polymers of N-vinyl pyrrolidone and (2) a polysilicic acid coagulant from a source selected from the group consisting of polysilicic acid hydrosols, stabilized polysilicic acid hydrosols, and polysilicic acid hydrogels in which the polysilicic acid has not polymerized to such an extent that syneresis has occurred; (b) aging the treated beverage for a period of time sufficient to allow said organic material and said polysilicic acid to coagulate and simultaneously fine and remove chill haze precursor substances from said beverage; and (c) separating the coagulated substances from the beverage. Other objects and embodiments of this invention will become apparent in the following detailed specification.

DESCRIPTION OF THE PREFERRED EMBODIMENTS

The nitrogeneous carbonyl containing organic material (hereinafter sometimes referred to as (NCCOM) ) useful in the practice of this invention is selected from the group consisting of gelatin, N-vinylpyrrolidone, and polymers of N-vinylpyrrolidone which are water soluble or colloidially dispersible in water.

The gelatin useful in this invention is a standard item of commerce. It is obtained by the selective hydrolysis of collagen which is the major structural protein in skin, tendon, and bone. Edible grades for fining beverages are usually prepared from slaughterhouse bones and pigskin by processing which avoids bacterial contamination. Edible gelatin is preferred for use in the process of this invention. Gelatin consists of a mixture of water soluble proteins of high average molecular weight, approximately 15,000 to 250,000. The two general kinds of commercial gelatin manufactured are often designated as type A (derived from acid-processed collagen) and type B (from alkaline-processed collagen). Type A gelatin is preferred in the process of this invention. Gelatin is further characterized by its jelly strength, or Bloom rating, which is measured with a plunger-type instrument known as the Bloom gelometer. It determines the weight in grams required to depress a flat plunger (12.7 mm in diameter) a distance of 4 mm into a jelly containing 6.67% gelatin. The jelly is made under carefully controlled conditions and is aged for 17 hours at 10° C for the Bloom test. Commercial gelatins ranging from 75 to 300 Bloom grams are available. Preferred for the process of this invention is gelatin having a Bloom rating from 150 to 300 grams. The article by V. L. Singleton cited herein presents an excellent discussion of the chemistry of gelatin and its use as a fining agent.

I have found that N-vinyl pyrrolidone and polymers of N-vinyl pyrrolidone which are soluble or colloidially dispersible in water are effective in the process of this invention. The molecular weight of degree of polymerization of the polymers is not critical provided that the polymers are soluble or colloidially dispersible in water. Preferably the polymers are water soluble. Particularly preferred polymers are homopolymers of N-vinyl pyrrolidone known in the art as polyvinylpyrrolidone (PVP). It is preferred that the molecular weight of the polyvinylpyrrolidone be greater than about 30,000.

The N-vinyl pyrrolidone useful in the practice of this invention is readily available. The GAF Corp., Dyestuff & Chemical Division, markets N-vinylpyrrolidone under the trademark V-PYROL. Technical Bulletin 7543–037 published by GAF Corporation describes the properties of N-vinyl pyrrolidone and processes for polymerizing N-vinyl pyrrolidone with other monomers. GAF Corp. also publishes three booklets disclosing references pertaining to the properties and uses of polyvinylpyrrolidone entitled "PVP An Annotated Bibliography 1951–1966." Vol. 1 is concerned with the Chemical, Physical, and Physiological Properties of PVP, Vol. 2 is concerned with the Food, Drug, and Cosmetic Uses of PVP, while Vol. 3 is concerned with the Industrial Uses of PVP.

The homopolymers of N-vinylpyrrolidone and copolymers of N-vinylpyrrolidone with other vinyl monomers such as N-vinyl-3-methyl-2-pyrrolidone, N-vinyl-2-piperidone, N-vinyl-2-caprolactam, N-vinylsuccinimide, N-vinyl-3-morpholinone, N-vinyl-5-methyl-2-oxazolidinone, N-vinyl-5-ethyl-2-oxazolidinone, N-vinyl-2-oxazolidinone, and acrylamide may be prepared from the monomers using methods known to those skilled in that art. The use of dilute solutions of the monomers during polymerization, or the use of large amounts of catalysts are among the many methods which may be used in their preparation and are not a part of this invention.

For the treatment of the beverage an aqueous solution or colloidial dispersion of the (NCCOM) is prepared and added to the beverage to be treated. The concentration of the (NCCOM) in the solution or dispersion is not critical. The concentration should be such that the solution or dispersion can be easily mixed into and dispersed throughout the beverage. Concentrations from 1% to 10% by weight are preferred. The (NCCOM) may be added to the beverage by means of a proportioning device which delivers measured quantities of the solution or dispersion to the beverage and is conveniently done as the beverage is being transferred to a storage tank. For the fining and chillproofing of beer the solution or dispersion is conveniently proportioned into the beer as the beer is being transported from the fermentor to ruh storage. Alternatively the solution or dispersion of the (NCCOM) may be added to a tank containing a small amount of the beverage and thoroughly mixed into the beverage by filling the tank with additional beverage, the mixing occuring as a result of the force and currents produced by the entering beverage.

The polysilicic acid coagulant useful in the practice of this invention must be added to the beverage in the form of a polysilicic acid hydrosol, a stabilized polysilicic acid hydrosol, or a polysilicic acid hydrogel. It is preferred that the polysilicic acid be added in the form of a polysilicic acid hydrosol.

The polysilicic acid hydrosol is prepared by first preparing a silicic acid hydrosol by a cation exchange process wherein an aqueous alkali metal silicate solution, preferably sodium silicate, is placed in intimate contact with a cation-exchange resin in its hydrogen form whereby the sodium ions in the silicate solution are removed by the resin and replaced with hydrogen ions from the resin, and aging the silicic acid hydrosol for a period of time sufficient to polymerize the silicic acid and produce a polysilicic acid hydrosol. Representative processes to prepare the silicic acid hydrosol are disclosed in the following U.S. Pats., all of which are incorporated herein by reference: Nos. 2,588,389; 2,726,216; 3,649,556. Particularly preferred is the process disclosed in U.S. Pat. No. 3,649,556. The silicic acid hydrosol has a pH within the range from 2 to 4, preferably 2.5 to 3.5, still more preferably 2.5 to 3, and has a silicic acid concentration from 1% to 9% calculated as weight percent silica, preferably 3% to 7%. The alkali metal silicate used to prepare the silicic acid should have a silica:alkali metal oxide ratio from 1:1 to about 4:1, preferably 2:1 to about 4:1.

The silicic acid hydrosol so obtained by ion-exchange commences to polymerize immediately forming a polysilicic acid hydrosol. The polysilicic acid initially formed at a pH within the range from 2 to 3 is of low molecular weight and is not as effective in the process of this invention as is polysilicic acid having a higher molecular weight, as the data in the examples hereinafter will indicate. Accordingly the polysilicic acid hydrosol may be aged to increase the degree of polymerization of the polysilicic acid. The polymerization rate of the polysilicic acid increases with an increase in temperature, an increase in the silica concentration, and an increase in pH. Increasing one or more of these variables will increase the rate of polymerization and will serve to decrease the aging time in order to achieve any particular degree of polymerization. The pH should not be increased above about 5 because of the very rapid polymerization rate above this pH. Conversely, if so desired, decreasing one or more of these variables will decrease the polymerization rate and increase the aging time necessary to achieve any particular degree of polymerization desired. For instance, a properly aged and effective polysilicic acid hydrosol can be stored at a temperature above but near freezing such as at 30° F for extended periods of time without appreciably affecting the degree of polymerization of the polysilicic acid, and hence, without affecting the effectiveness of the polysilicic acid to combine with the (NCCOM) and effectively clarify and increase the chill haze stability of a vegetable beverage.

The polysilicic acid hydrogel is prepared by aging the polysilicic acid hydrosol at a pH within the range from 2 to about 5, preferably 2 to 4, until the polymerization of the polysilicic acid results in gelation of the hydrosol as evidenced by its achieving a semi-rigid, non-flowable gelled state. As previously indicated, the rate of polymerization of the polysilicic acid increases with an increase in temperature, with an increase in pH, and with an increase in the polysilicic acid concentration. Therefore the aging time necessary to produce the hydrogel can be increased or decreased by decreasing or increasing one or all of these variables, respectively. The polymerization of the polysilicic acid continues in the hydrogel state. In order to be effective in the process of this invention the polymerization of the polysilicic acid must not proceed to the extent of causing syneresis to occur. As syneresis occurs water is separated from the hydrogel and the polysilicic acid agglomerates into a more compact silica structure. When this occurs the hydrogel apparently ceases to function as a coagulant and functions essentially as an adsorbent. When the polysilicic acid ceases to function as a coagulant is separate addition to a vegetable beverage with the (NCCOM) disclosed herein fails to efficiently fine (clarify) the beverage although some chill haze stability will be imparted to the beverage.

The stabilized polysilicic acid hydrosol is prepared from the polysilicic acid hydrosol by adjusting the silica to alkali oxide ratio of the hydrosol as is well known in the silica art. For example, U.S. Pat. No. 2,244,325 indicates a process for preparing a stabilized silicic acid hydrosol wherein said hydrosol has a silica to sodium oxide ratio of greater than 10:1 to about 100:1. U.S. Pat. No. 2,574,902 indicates that silicic acid hydrosols having a silica:alkali oxide ratio of about 60:1 to 130:1 are stable against gelation for extended periods. U.S. Pat. No. 2,577,485 indicates that essentially salt free silicic acid hydrosols having a silica:alkali oxide ratio of from 130:1 to 500:1 are stable against gelation for extended periods. Thus the stabilized polysilicic acid hydrosol can be prepared from a polysilicic acid hydrosol by adjusting the silica to alkali oxide ratio of the hydrosol to obtain a ratio within the range from greater than 10:1 to 500:1, preferably 30:1 to 150:1. I have found that polysilicic acid hydrosols prepared by aging a silicic acid hydrosol prepared by the process claimed in U.S. Pat. No. 3,649,556 are preferably stabilized by adding sodium hydroxide to the hydrosol in order to provide the hydrosol with a silica to sodium oxide ratio within the range from 30:1 to 150:1. The concentration of polysilicic acid in the stabilized polysilicic acid hydrolsol can be increased by heating and evaporating water from the hydrosol, preferably at reduced pressure. Stabilized hydrosols containing up to about 35% polysilicic acid, calculated as silica, can be prepared in this manner.

For the treatment of the beverage the polysilicic acid in the form of a polysilicic acid hydrosol or a stabilized polysilicic acid hydrosol is conveniently proportioned into the beverage as the beverage is being transported to a storage tank. In the case of beer this is conveniently achieved as the beer is transferred from the fermentor to ruh storage. When the polysilicic acid is in the form of a hydrogel, the hydrogel must be broken up and rendered flowable before addition to the beverage. This is conveniently done by mixing the hydrogel with an amount of water sufficient to produce a flowable slurry. This slurry can then be added in the same manner as the polysilicic acid hydrosol and stabilized hydrosol.

The amounts of the (NCCOM) and the polysilicic acid added to the beverage for effective fining and chillproofing will depend greatly on the particular beverage to be treated and on the clarity of the beverage desired. Generally from 10 to 100 p.p.m. of the (NCCOM) and from 50 to 500 p.p.m. of the polysilicic acid will be sufficient. Preferably the concentration of the (NCCOM) will be from 25 to 75 p.p.m. (parts, by weight, per million parts of the beverage) and the concentration of the polysilicic acid will be from 100 to 300 p.p.m. In all beverages the concentration of the polysilicic acid should exceed the concentration of the (NCCOM). For the fining and chillproofing of beer and wine, it is preferred that the (NCCOM) and the polysilicic acid be added after primary fermentation and before final filtration.

The order of addition of the (NCCOM) and the polysilicic acid to the vegetable beverage is generally not critical and either material may be added to the beverage first. We have found, however, that the fining of some beers is better if the (NCCOM) is added before the polysilicic acid. Thus it is preferred that the (NCCOM) be added to the vegetable beverage before the polysilicic acid is added.

After addition of the (NCCOM) and the polysilicic acid to the beverage the treated beverage must be aged for a period of time which is sufficient to allow the (NCCOM) and polysilicic acid to coagulate. During this aging period the beverage is simultaneously fined and chill haze precursor substances are removed from the beverage as the coagulated material settles out of the beverage. The aging time will depend on the type and characteristics of the beverage treated, the amount of (NCCOM) and polysilicic acid added to the beverage, and on the turbidity or clarity of the beverage which is desired.

Following the aging period the beverage must be processed to remove the coagulated substances from the beverage, such as by centrifugation, filtration, or decantation. This is conveniently done by filtering the beverage. It may be desireable to add an enzyme such as papain to the treated and filtered beverage to further increase the chill haze stability of the beverage. In this case much less enzyme is needed than would be needed in the absence of the prior treatment of the beverage with the polysilicic acid and the (NCCOM).

The following examples illustrate the process of my invention and the benefits afforded through the utilization thereof, but are not to be construed as limiting the same except as discussed herein.

In these examples the gelatin used was obtained from the Grayslake Gelatin Co. It is a 200 Bloom U. S. P. Type A Gelatin, pH 4.55–4.60. It was added to the beverages in the form of a 2% by weight aqueous solution.

EXAMPLE 1

The beer employed in this example was obtained immediately prior to ruh storage from a commercial brewery and transferred to a pilot brewery. There it was bottled in 12 oz. clear bottles and crowned with perforated caps and rubber stoppers to allow for syringe injection of the desired treating materials. A silicic acid hydrosol was prepared by the process claimed in U.S. Pat. No. 3,649,556. The hydrosol contained 5% by weight silicic acid, calculated as silica, and had a pH of 2.9. To duplicate bottles of this fermented beer were added 50 p.p.m. (parts per million parts of beer, by weight) of gelatin followed by the addition of 200 p.p.m. of polysilicic acid obtained by aging the silicic acid hydrosol at room temperature for the number of hours indicated in Table 1. Between 48 and 72 hours aging the polysilicic acid hydrosol polymerized to form a hydrogel. This hydrogel was also evaluated at 200 p.p.m. After one week of storage at 30°–32° F, during which time the gelatin and polysilicic acid reacted forming a flocculant precipitate which simultaneously fined and removed chill haze precursor substances from the beer, and during which time gelatin, polysilicic acid and the materials removed from the beer settled as a sludge to the bottom of the bottles, the turbidities of the treated beer samples were determined with a commercial nephelometer (HAZE METER, Type UKM 1b, manufactured by Radiometer of Copenhagen), expressed as A. S. B. C. Formazin Turbidity Units to give an indication of the fining of the beer. The treated beer samples were then filtered through ultrafilters containing 1.2μ pores (MILLIPORE filters), rebottled with standard caps and placed in a cooler at 30°–32° F. The chill haze stability was determined with a commercial nephelometer, expressed as Formazin Turbidity Units, after the beer samples were stored for 24 hours and 168 hours. The data obtained are given in Table 1.

Table 1

50 p.p.m. Gelatin + 200 p.p.m. Polysilicic Acid

| Age of Polysilicic Acid Hydrosol Before Addition To The Beer, Hours | Formazin Turbidity Units | | |
|---|---|---|---|
| | Fining | Chill Haze | |
| | 168 Hours | 24 Hours | 168 Hours |
| 0 | 650+ | 270 | 312 |
| 1 | 278 | 144 | 179 |
| 2 | 268 | 62 | 94 |
| 4 | 294 | 100 | 141 |
| 8 | 207 | 81 | 181 |
| 12 | 162 | 86 | 129 |
| 20 | 152 | 70 | 104 |
| 24 | 54 | 35 | 44 |
| 48 | 52 | 30 | 37 |
| 72[1] | 65 | 47 | 88 |
| 0[2] | 650+ | 360 | 396 |

1. Hydrogel
2. No gelatin or polysilicic acid added

This data indicates that the addition of gelatin and polysilicic acid in the form of a properly aged hydrosol and as a hydrogel effectively fined and enhanced the chill haze stability of the beer.

EXAMPLE 2

The beer employed for these tests was obtained from a commercial brewery immediately prior to ruh storage, transferred to a pilot brewery, and bottled as in Example 1. Duplicate bottles of this fermented beer were treated with various concentrations of gelatin and polysilicic acid as indicated in Table 2. The gel was added first in the bottles treated with both gelatin and polysilicic acid. The polysilicic acid hydrosol was prepared by aging for 48 hours a silicic acid hydrosol obtained by the process claimed in U.S. Pat. No. 3,649,556 containing 5% silicic acid, as silica, and having a pH of 2.9. A portion of this silicic acid hydrosol was diluted to 3% silicic acid before aging and testing. The beer was also treated with polysilicic acid in the form or stabilized polysilicic acid hydrosols. The stabilized polysilicic acid hydrosols were obtained from E. I. duPont de Nemours & Co., Inc. under the trademarks Ludox SM-30, Ludox HS, and Ludox TM. Ludox SM-30 contains 30% silica of a particle size within the range from 7–8 m$\mu$ having a surface area from 375–420 sq.m./gm., and a $SiO_2:Na_2O$ weight ratio of 50. Ludox HS contains 30% silica of a particle size within the range from 13–14 m$\mu$ having a surface area from 210–230 sq.m./gm., and a $SiO_2:Na_2O$ wt. ratio of 93. Ludox TM contains $\geq$ 49% silica of a particle size within the range from 22–25 m$\mu$ having a surface area from 125–140 sq.m./gm., and a $SiO_2:Na_2O$ wt. ratio of 230. These Ludox samples were diluted to 5% silica before treating the beer.

The turbidities of the treated beer samples were determined after 24, 96, and 168 hours of storage at 30°–32° F to give an indication of the fining of the beer. The treated beer samples after 168 hours storage were then filtered through 1.2$\mu$ MILLIPORE filters, rebottled with standard caps, placed in a cooler at 30°–32° F and evaluated for chill haze stability as in Example 1. The data obtained are given in Table 2.

The data indicate the remarkable synergistic results obtained in the fining and chillproofing of the beer upon the addition of gelatin and polysilicic acid to the beer. The data also indicate that the preferred form of the polysilicic acid is in the form of an unstabilized hydrosol and that concentrations of gelatin from 10 to 100 p.p.m., preferably 25 to 75 p.p.m., can be used in treating vegetable beverages.

TABLE 2

| Polysilicic acid (PSA) hydrosol | | | PSA (p.p.m.) | Gelatin (p.p.m.) | Formazin turbidity units | | | | |
|---|---|---|---|---|---|---|---|---|---|
| | | | | | Fining | | | Chill haze | |
| Age (hours) | SiO₂ (%) | pH | | | 24 hours | 96 hours | 168 hours | 24 hours | 168 hours |
| | | | 0 | 0 | 650+ | 650+ | 650+ | 418 | 470 |
| | | | 0 | 10 | 650+ | 543 | 323 | 98 | 200 |
| | | | 0 | 25 | 650+ | 358 | 208 | 109 | 174 |
| | | | 0 | 50 | 650+ | 286 | 196 | 88 | 159 |
| | | | 0 | 75 | 650+ | 295 | 190 | 109 | 170 |
| | | | 0 | 100 | 650+ | 313 | 216 | 112 | 187 |
| 48 | 5 | 2.9 | 200 | 0 | 348 | 318 | 250 | 53 | 125 |
| 48 | 5 | 2.9 | 200 | 10 | 245 | 206 | 156 | 50 | 102 |
| 48 | 5 | 2.9 | 200 | 25 | 155 | 103 | 85 | 48 | 98 |
| 48 | 5 | 2.9 | 200 | 50 | 153 | 91 | 80 | 64 | 124 |
| 48 | 5 | 2.9 | 200 | 75 | 190 | 101 | 79 | 49 | 100 |
| 48 | 5 | 2.9 | 200 | 100 | 277 | 148 | 120 | 59 | 99 |
| 48 | 3 | 2.9 | 200 | 0 | 588 | 515 | 507 | 90 | 100 |
| 48 | 3 | 2.9 | 200 | 50 | 210 | 119 | 112 | 54 | 100 |
| Stabilized PSA hydrosol: | | | | | | | | | |
| Ludox SM-30 | | | 200 | 0 | 530 | 350 | 306 | 106 | 163 |
| Ludox SM-30 | | | 200 | 50 | 370 | 220 | 167 | 46 | 65 |
| Ludox HS | | | 200 | 0 | 650+ | 575 | 500 | 129 | 242 |
| Ludox HS | | | 200 | 50 | 345 | 227 | 191 | 49 | 101 |
| Ludox TM | | | 200 | 0 | 650+ | 650+ | 645 | 172 | 285 |
| Ludox TM | | | 200 | 50 | 425 | 212 | 178 | 76 | 142 |

EXAMPLE 3

The beer employed in these tests was obtained immediately prior to ruh storage from a commercial brewery, transferred to a pilot brewery, and bottled as in Example 1. Duplicate bottles of this fermented beer were treated with 50 p.p.m. gelatin followed by 200 p.p.m. polysilicic acid added in the form of a stabilized polysilicic acid hydrosol. The various stabilized polysilicic acid hydrosols evaulated were prepared by adding sodium hydroxide to polysilicic acid hydrosols, prepared by aging a silicic acid hydrosol prepared by the process claimed in U.S. Pat. No. 3,649,556 for the times and at the concentrations indicated in Table 3, to lower the $SiO_2:Na_2O$ weight ratio to the values indicated in Table 3. These stabilized hydrosols were then aged for the number of days indicated in Table 3 before their use in these experiments. Duplicate bottles of this fermented beer were also treated with 200 p.p.m. of polysilicic acid and 50 p.p.m. of either gelatin, polyvinylpyrrolidone (PVP) or N-vinylpyrrolidone (NVP). The polysilicic acid was added in the form of a polysilicic acid hydrosol prepared as in Example 1 and aged 40 hours before use. A sample of the same hydrosol aged 46 hours and a sample of a polysilicic acid hydrogel obtained by aging the hydrosol a total of 64 hours were also evaluated with gelatin. The order of addition of the polysilicic acid and the (NCCOM) to the beer was varied as indicated in Table 3. The polysilicic acid and the (NCCOM) were also mixed together before their addition to the beer to illustrate the enhanced results obtained in the fining and chillproofing of vegetable beverages by the separate addition of the polysilicic acid and the (NCCOM). The treated bottles of beer were then evaluated and processed as in Example 2. The data obtained are given in Table 3.

TABLE 3
(50 p.p.m. (NCCOM) + 200 p.p.m. polysilicic acid)

| Stabilized polysilicic acid hydrosol | | | | | Formazin turbidity units | | | | |
|---|---|---|---|---|---|---|---|---|---|
| | | | | | Fining | | | Chill haze | |
| Age when stabilized (hours) | SiO₂ (%) | Age when used (days) | Weight ratio (SiO₂/Na₂O) | (NCCOM) | 24 hours | 96 hours | 168 hours | 24 hours | 168 hours |
| 8 | 6.0 | 61 | 73 | Gelatin | 210 | 94 | 85 | 44 | 86 |
| 12 | 6.0 | 61 | 73 | ...do... | 226 | 101 | 85 | 43 | 85 |
| 24 | 6.0 | 60 | 83 | ...do... | 228 | 104 | 98 | 52 | 85 |
| 36 | 6.0 | 60 | 97 | ...do... | 263 | 107 | 97 | 46 | 82 |
| 24 | 6.0 | 60 | 106 | ...do... | 229 | 102 | 100 | 58 | 93 |
| 24 | 6.0 | 60 | 36 | ...do... | 192 | 96 | 84 | 51 | 98 |
| 24 | 5.2 | 92 | 129 | ...do... | 208 | 98 | 76 | 48 | 90 |
| 8 | 5.6 | 22 | 97 | ...do... | 235 | 92 | 79 | 47 | 75 |

| Polysilicic acid hydrosol | | | | | | | | | |
|---|---|---|---|---|---|---|---|---|---|
| Age when used (hour) | | Order of addition | (NCCOM) | Order of addition | | | | | |
| 40 | | 1 | none | | 610 | 502 | 380 | 51 | 96 |
| (non added) | | | Gelatin | 1 | 650+ | 221 | 164 | 110 | 115 |
| 40 | | 2 | ...do... | 1 | 137 | 99 | 73 | 49 | 97 |
| 46 | | 2 | ...do... | 1 | 186 | 62 | 59 | 42 | 64 |
| 64 [1] | | 2 | ...do... | 1 | 240 | 119 | 88 | 44 | 66 |

TABLE 3 – Continued

| | | | | | | | |
|---|---|---|---|---|---|---|---|
| 40 | 1 | ......do............ | 2 | 207 | 104 | 77 | 42 | 92 |
| 40 | ²M | ......do............ | ²M | 650+ | 650+ | 650+ | 64 | 123 |
| 40 | 2 | PVP K-90³..... | 1 | 176 | 139 | 115 | 49 | 83 |
| 40 | 1 | PVP K-90....... | 2 | 166 | 126 | 103 | 49 | 87 |
| 40 | M | PVP K-90....... | M | 589 | 587 | 512 | 52 | 94 |
| 40 | 2 | NVP⁴............ | 1 | 182 | 136 | 118 | 48 | 77 |
| 40 | 1 | NVP............... | 2 | 139 | 102 | 102 | 49 | 75 |
| 40 | M | NVP............... | M | 650+ | 609+ | 569+ | 76 | 125 |

¹ Hydrogel.
² M indicates that the (NCCOM) and the polysilicic acid were mixed together in a syringe before treating the beer. Not an illustration of this invention.
³ PVP K-90 = polyvinylpyrrolidone, molecular weight 360,000; product of GAF Corporation.
⁴ NVP = N-vinyl-2-pyrrolidone (N-vinylpyrrolidone).

EXAMPLE 4

One hundred gallons of silicic acid hydrosol containing 5% silicic acid calculated as silica, was prepared by the process claimed in U.S. Pat. No. 3,649,556. A polysilicic acid hydrosol was prepared by aging this silicic acid hydrosol for 30 hours. The hydrosol was then placed in a cooler at 30° F and left overnight. A 2% by weight gelatin solution was prepared in 130° F tap water and injected at a rate of 30 p.p.m. into freshly fermented beer before the beer was cooled. The polysilicic acid was injected into this beer after the beer has passed through the cooler at a rate of 150 p.p.m. A total of 875 barrels of beer was treated over a period of two hours. The beer was then placed in ruh storage at 30° F. The next day a sample of the treated beer was taken from the storage tank and visually compared to a sample of beer treated with TANSUL-7 (hectorite clay). The beer treated with gelatin and polysilicic acid was substantially better fined. After one week of ruh storage the beer treated with gelatin and polysilicic acid was visually compared with a TANSUL-7 treated beer that had been in ruh storage for 3 weeks and this beer again exhibited superior fining characteristics. The treated beer was then filtered through diatomaeceous earth and treated with 20 p.p.m. enzyme before final filtration and bottling.

The bottled beer which has been treated with gelatin and polysilicic acid and a TANSUL-7 treated beer (3 weeks ruh storage) similarly processed were subjected to forcing tests, after 15 days and 2 months of bottled room temperature storage, and the chill haze stability determined with a commercial nephelometer, the turbidities being expressed as A. S. B. C. Formazin Turbidity Units (FTU). The forcing tests consisted of: (1) chilling for 48 hours at 30° F; (2) agitation by rotating the bottles at 11 rpm for 12 hours followed by 24 hours chilling at 30° F; (3) incubation at 120° F for 48 hours followed by 24 hours chilling at 30° F. The data obtained are given in Table 4.

TABLE 4. – FORMAZIN TURBIDITY UNITS

| Beer | Room temperature | | 48 hr. chill at 30°F | | 12 hour agitation + 24 hr. chill at 30°F | | 48 hour incubation + 24 hr. chill at 30°F | |
|---|---|---|---|---|---|---|---|---|
| | 15 days | 2 months | 15 days | 2 months | 15 days | 2 months | 15 days | 2 months |
| A*............ | 26 | 55 | 35 | 75 | 89 | 153 | 42 | 112 |
| B**........... | 38 | 52 | 49 | 72 | 101 | 135 | 43 | 198 |

*A = Beer treated with gelatin and polysilicic acid.
**B = Beer treated with TANSUL-7 (hectorite clay).

I claim:

1. A method of fining and increasing the chill haze stability of a fermented alcholic beverage, which comprises, the following steps in the order indicated.
   a. adding to the beverage separately and in any order a nitrogeneous carbonyl containing organic material which is water soluble or colloidially dispersible in water selected from the group consisting of gelatin, N-vinylpyrrolidone, and polymers of N-vinyl-pyrrolidone and a polysilicic acid coagulant in hydrogel form obtained by forming a silicic acid hydrosol and aging the silicic acid hydrosol for a period of time which is sufficient to produce a gelatinous semi-solid hydrogel and insufficient to cause the separation of water by syneresis from the hydrogel, wherein the silicic acid hydrosol is formed by placing an aqueous solution of sodium silicate into intimate contact with a cation exchange resin in its hydrogen form whereby sodium ions in the silicate solution are removed by the resin and replaced with hydrogen ions from the resin;
   b. aging the treated beverage for a period of time sufficient to allow the nitrogeneous carbonyl containing organic material and the polysilicic acid to coagulate and simultaneously fine and remove chill haze precursor substances from the beverage; and
   c. separating the coagulated substances from the beverage.

2. The method of claim 1 wherein said beverage is beer.

3. The method of claim 2 wherein the amount of the nitrogeneous carbonyl containing organic material added is from 10 to 100 p.p.m. and the amount of the polysilicic acid added is from 50 to 500 p.p.m.

4. The method of claim 3 wherein the amount of the nitrogeneous carbonyl containing organic material is from 25 to 75 p.p.m.

5. The method of claim 4 wherein the amount of the polysilicic acid is from 100 to 300 p.p.m.

6. The method of claim 2 wherein the nitrogeneous carbonyl containing organic material is gelatin.

7. The method of claim 3 wherein the nitrogeneous carbonyl containing organic material is gelatin.

8. The method of claim 4 wherein the nitrogeneous carbonyl containing organic material is gelatin.

9. A method of fining and increasing the chill haze stability of a fermented alcoholic beverage, which comprises, the following steps in the order indicated:
   a. adding to the beverage separately and in any order a nitrogeneous carbonyl containing organic material which is water soluble or colloidially dispersible in water selected from the group consisting of gelatin, N-vinylpyrrolidone, and polymers of N-vinylpyrrolidone and a polysilicic acid coagulant in the form of a stabilized polysilicic acid hydrosol obtained by (1) forming a silicic acid hydrosol by placing an aqueous solution of sodium silicate into intimate contact with a cation exchange resin in its hydrogen form whereby sodium ions in the silicate solution are removed by the resin and replaced with hydrogen ions from the resin, (2) aging the silicic acid hydrosol for a period of time which is sufficient to produce a polysilicic acid hydrosol and insufficient to produce a gelatinous semi-solid hydrogel, and (3) adjusting the silica to alkali oxide ratio of the polysilicic acid hydrosol to a value within the range from 10:1 to 500:1 with sodium hydroxide;

b. aging the treated beverage for a period of time sufficient to allow the nitrogenous carbonyl containing organic material and the polysilicic acid to coagulate and simultaneously fine and remove chill haze precursor substances from the beverage; and c. separating the coagulated substances from the beverage.

10. The method of claim 9 wherein the beverage is beer.

11. The method of claim 10 wherein the amount of the nitrogeneous carbonyl containing organic material added is from 10 to 100 p.p.m. and the amount of the polysilicic acid added is from 50 to 500 p.p.m.

12. The method of claim 11 wherein the amount of the nitrogeneous carbonyl containing organic material is from 25 to 75 p.p.m.

13. The method of claim 12 wherein the amount of the polysilicic acid is from 100 to 300 p.p.m.

14. The method of claim 10 wherein the nitrogeneous carbonyl containing organic material is gelatin.

15. The method of claim 14 wherein the gelatin is added to the beverage before the polysilicic acid coagulant is added to the beverage.

16. The method of claim 11 wherein the nitrogeneous carbonyl containing organic material is gelatin.

17. The method of claim 6 wherein the gelatin is added to the beverage before the polysilicic acid coagulant is added to the beverage.

* * * * *